United States Patent
Asrani et al.

(10) Patent No.: US 8,604,980 B2
(45) Date of Patent: Dec. 10, 2013

(54) ANTENNA SYSTEM WITH NON-RESONATING STRUCTURE

(75) Inventors: Vijay Asrani, Round Lake, IL (US); Adrian Napoles, Lake Villa, IL (US); Louis Vannatta, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 944 days.

(21) Appl. No.: 12/645,038

(22) Filed: Dec. 22, 2009

(65) Prior Publication Data

US 2011/0148731 A1  Jun. 23, 2011

(51) Int. Cl.
*H01Q 1/38* (2006.01)

(52) U.S. Cl.
USPC .................... 343/700 MS; 343/702

(58) Field of Classification Search
USPC .................. 343/700 MS, 702, 895
See application file for complete search history.

(56) References Cited

U.S. PATENT DOCUMENTS

| | | | |
|---|---|---|---|
| 5,977,916 A | 11/1999 | Vannatta et al. | |
| 6,175,334 B1 | 1/2001 | Vannatta et al. | |
| 6,686,886 B2 * | 2/2004 | Flint et al. | 343/702 |
| 6,765,536 B2 | 7/2004 | Phillips et al. | |
| 7,026,999 B2 * | 4/2006 | Umehara et al. | 343/702 |
| 7,265,720 B1 | 9/2007 | Ponce De Leon et al. | |
| 7,830,320 B2 * | 11/2010 | Shamblin et al. | 343/747 |
| 2005/0190107 A1 * | 9/2005 | Takagi et al. | 343/702 |
| 2010/0164812 A1 * | 7/2010 | Ganeshan et al. | 343/702 |

* cited by examiner

*Primary Examiner* — Tan Ho

(74) *Attorney, Agent, or Firm* — Daniel R. Collopy; Ingrassia Fisher & Lorenz, PC; Sylvia Chen

(57) ABSTRACT

An antenna system for reception and transmission of radio frequency (RF) signals and a method for tuning the antenna system are provided. The antenna system includes a ground plane, a first element and a second element. The first element includes a driven unbalanced antenna element that resonates within at least one predetermined first frequency band to transmit and receive radio frequency (RF) signals modulated at one or more frequencies within the at least one predetermined first frequency band. The second element is non-resonating within the at least one predetermined first frequency band and is located within an antenna volume of the first element to create a partial loop response within the antenna volume of the first element by capacitively coupling to the first element when connected to the ground plane.

14 Claims, 21 Drawing Sheets

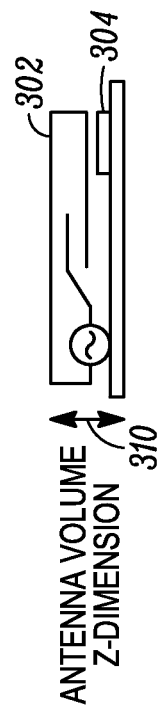
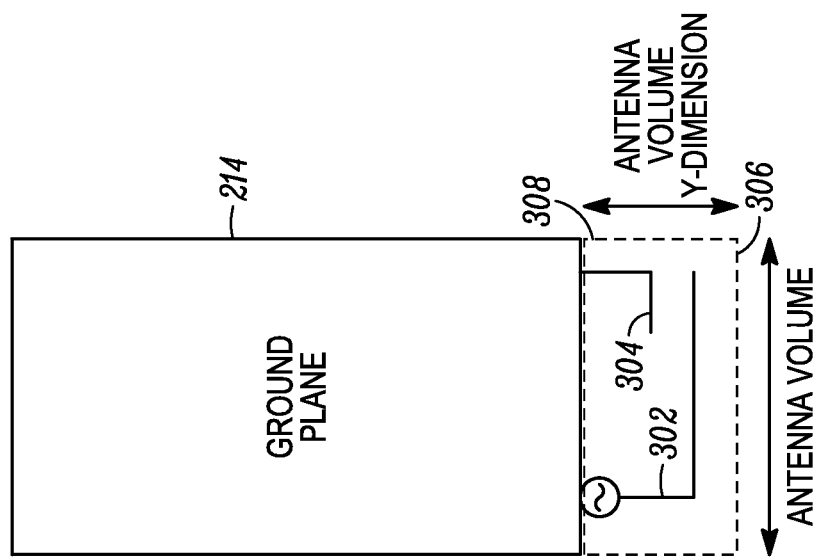

ANTENNA SYSTEM WITH NON-RESONATING STRUCTURE

FIELD OF THE INVENTION

The present invention generally relates to radio frequency (RF) antenna systems, and more particularly relates to RF antenna systems for portable communication devices that include a non-resonating structure.

BACKGROUND OF THE DISCLOSURE

The radio frequency (RF) transmissions of some portable communication devices, such as some cellular telephones, can interfere with a user's hearing aid. Such interference may cause an annoying and/or painful buzzing noise. In some countries, governmental design constraints have been or are being proposed for the RF transmissions of portable communication devices to exhibit reduced electric field and magnetic field behavior near an earpiece of the portable communication device to reduce such interference.

In the United States, for example, the American National Standards Institute (ANSI) Accredited Standards Committee C63 on Electromagnetic Compatibility has defined standard ANSI C63.19 to establish compatibility between hearing aids and portable communication devices such as cellular telephones. ANSI C63.19 specifies that the RF transmissions of a portable communication device must have particular characteristics in the area of the portable communication device's earpiece (i.e., approximately where a person's hearing aid would be located). More particularly, ANSI C63.19 specifies that the electric field and magnetic field generated by portable communication device RF transmissions conform to certain characteristics proximate the portable communication device's earpiece. While the electric field and magnetic field proximate the portable communication device's earpiece can be decreased by an overall reduction in the RF transmission electric and magnetic fields, maintaining such reduced electric and magnetic fields significantly impacts the transmission and reception efficiency of the portable communication device.

Thus, there is an opportunity to develop an RF antenna system for a portable communication device that produces reduced electric field and magnetic field behavior near an earpiece thereof without significantly impacting the transmission and reception efficiency of the portable communication device. Furthermore, other desirable features and characteristics will become apparent from the subsequent detailed description and the appended claims, taken in conjunction with the accompanying drawings and this background of the disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 3A is a rear planar cutaway view of the portable communication device of FIG. 2B depicting an antenna system in accordance with the first embodiment;

FIG. 3B is a bottom planar cutaway view of the portable communication device of FIG. 2B depicting the antenna system of FIG. 3A in accordance with the first embodiment;

Figure 1A:
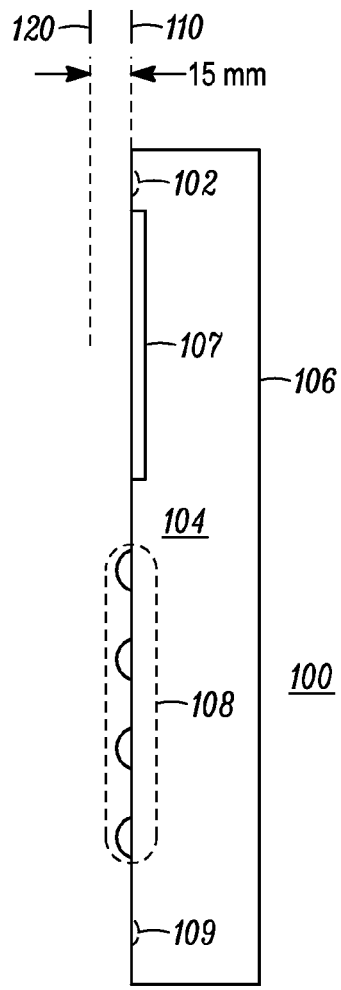
FIG. 1A is a right planar view of a conventional portable communication device of FIG. 1A depicting the spatial location of the American National Standards Institute (ANSI) C63.19 measurement grid.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Before describing in detail embodiments that are in accordance with the present invention, it should be observed that the embodiments reside primarily in combinations of apparatus components related to antenna systems. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An antenna system for transmission and reception of radio frequency (RF) signals includes a ground plane, a first element and a second element. The first element includes a driven unbalanced antenna element and resonates within at least one predetermined first frequency band to transmit and receive radio frequency (RF) signals modulated at one or more frequencies within the at least one predetermined first frequency band. The second element is non-resonating within the at least one predetermined first frequency band and is located within an antenna volume of the first element to create a partial loop response within the antenna volume of the first element by capacitively coupling to the first element when connected to the ground plane.

Further, a portable communication device is provided for transmission and reception of radio frequency (RF) signals. The portable electronic device includes an earpiece speaker, an antenna system, transceiver circuitry, and a controller. The earpiece speaker receives electrical signals and generates audio signals as audible output. The antenna system includes a first element and a second element. The first element of the antenna system includes a driven unbalanced antenna element and resonates within at least one predetermined first frequency band for transmitting and receiving RF signals modulated at one or more frequencies within the at least one predetermined first frequency band. The second element of the antenna system is non-resonating within the at least one predetermined first frequency band and is located within an antenna volume of the first element to create a partial loop response within the antenna volume when connected to the ground plane while reducing electromagnetic fields of RF signals transmitted by the first element at locations proximate to the earpiece speaker. The transceiver circuitry is coupled to the antenna system and includes transmitter circuitry for modulating signals for transmission from the antenna system as RF signals and receiver circuitry for demodulating RF signals received by the antenna system to generate demodulated signals. The controller is coupled to the transceiver circuitry for providing the signals to the transmitter circuitry for modulation thereby and for receiving the demodulated signals from the receiver circuitry. The controller is also coupled to the earpiece speaker for providing electrical signals to the earpiece speaker for generation of the audio signals to be provided from the earpiece speaker.

In addition, a method is provided for tuning an antenna system that includes a ground plane, a first element and a second element to communicate within at least one predetermined frequency band. The first element includes a driven unbalanced antenna element resonating within the at least one predetermined first frequency band while the second element is non-resonating within the at least one predetermined first frequency band and is located within an antenna volume of the first element. The method includes the steps of connecting the second element to the ground plane to create a partial loop response within the antenna volume of the first element when the first element transmits radio frequency (RF) signals modulated at one or more frequencies within the at least one predetermined first frequency band, and disconnecting the second element from the ground plane when the first element is not transmitting RF signals modulated at one or more frequencies within the at least one predetermined first frequency band.

The following detailed description is merely exemplary in nature and is not intended to limit the invention or the implementation and uses of the invention. Furthermore, there is no intention to be bound by any theory presented in the preceding background of the disclosure or the detailed description.

Figure 1B:
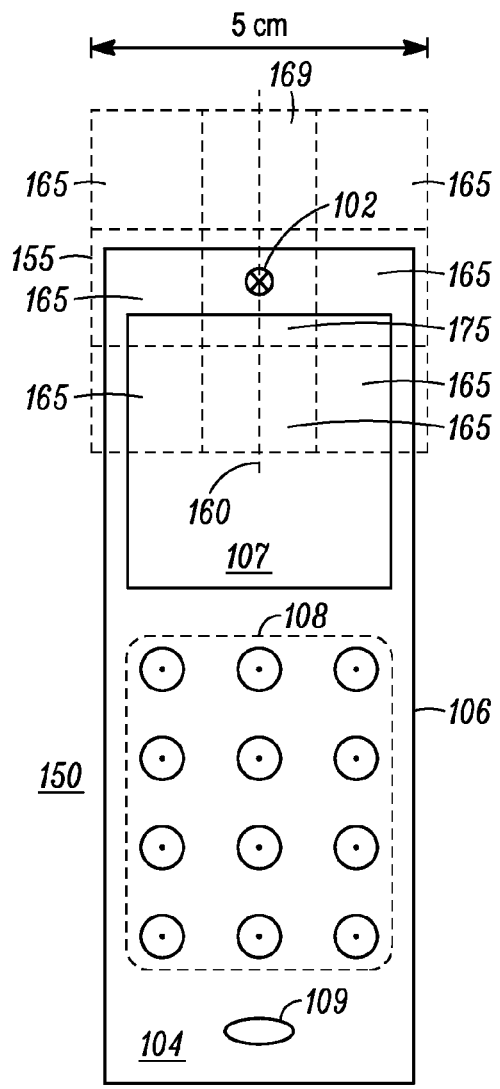
FIG. 1B is a front planar view of an earpiece of the conventional portable communication device of FIG. 1A with an overlay of the ANSI C63.19 measurement grid.

In the United States, the American National Standards Institute (ANSI) Accredited Standards Committee C63 on Electromagnetic Compatibility has defined standard ANSI C63.19 to establish compatibility between hearing aids and portable communication devices such as cellular telephones. ANSI C63.19 specifies that the RF transmissions of a portable communication device must have particular characteristics in the area of the portable communication device's earpiece (i.e., approximately where a person's hearing aid would be located during use of the portable communication device). More particularly, ANSI C63.19 specifies that the electric field and magnetic field generated by portable communication device RF transmissions conform to certain characteristics proximate the portable communication device's earpiece. Referring to FIGS. 1A and 1B, the specifications of ANSI C63.19 are graphically depicted, where FIG. 1A depicts a side planar view of an earpiece portion of a cellular phone and FIG. 1B depicts a front planar view of the earpiece portion.

Referring to FIG. 1A, the side planar view 100 depicts an earpiece portion 102 of a cellular telephone 104 or other portable communication device having a housing 106. A display 107, keys of a keypad 108 and a microphone portion 109 of the cellular telephone 104 are also mounted on the housing 106. A reference plane 110 is depicted perpendicular to and on the earpiece portion 102. A measurement plane 120 is proscribed fifteen millimeters above the reference plane 110. Measurements of the electric field and magnetic field of RF transmission of the cellular telephone 104 are taken in the measurement plane 120 to determine hearing aid compatibility in compliance with ANSI C63.19.

FIG. 1B depicts a front planar view 150 of the cellular telephone 104 shown in FIG. 1A including a view of the earpiece portion 102 and a five centimeter by five centimeter control area 155 in the measurement plane 120. The control area 155 is centered over an earpiece speaker located behind a housing opening in the earpiece portion 102 such that a centerline 160 of the control area 155 is located above a centerline of the earpiece portion 102. The control area 155 is divided into nine equal compliance areas 165 and the compliance of the cellular telephone 104 is determined by measuring the electric and magnetic fields of the RF emissions in each of the compliance areas 165 when the cellular telephone 104 is transmitting (i.e., the electric and magnetic fields of the RF transmissions). In accordance with the ANSI C63.19 standard measurement scheme, up to three exclusion blocks are allowed per measurement, with the restrictions that the center compliance area 175 cannot be excluded and at least one of the excluded compliance areas is commonly excluded for both the electric and magnetic field compliance determinations. Thus, if at least six of the nine compliance areas 165 (including the center compliance area 175) are in compliance for each measurement, then the cellular telephone 104 is determined to be compliant with the ANSI C63.19 standard.

Portable communication devices, such as cellular telephones, utilize antenna systems for receiving and transmitting radio frequency (RF) signals in various RF bands such as cellular or Bluetooth RF bands. Conventional dipole and loop antennas have minimum coupling onto the portable communication device's chassis and provide balanced RF driving. Due to the low coupling fields on the chassis, such conventional dipole and loop antennas are readily hearing aid compliant (i.e., compliant with the ANSI C63.19 standard). However, such dipole and loop antennas have a low bandwidth response.

Figure 2A:
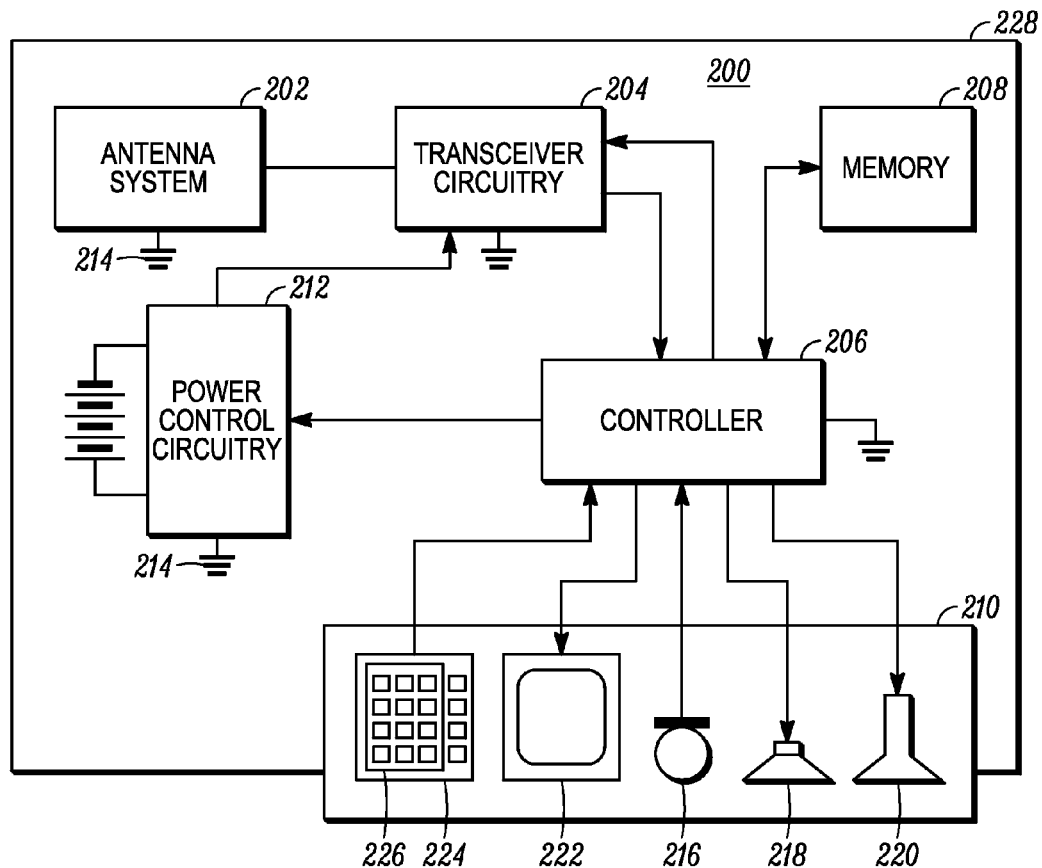
FIG. 2A is a block diagram of a portable communication device including an antenna system in accordance with a first embodiment.

Referring to FIG. 2A, a block diagram depicts a portable communication device 200, such as a cellular telephone, in accordance with a first embodiment which utilizes an antenna system 202 including an unbalanced antenna, such as a monopole antenna, which provides both a wide bandwidth response and hearing aid compliance. Although the portable communication device 200 is depicted as a cellular telephone, the portable communication device can be implemented as a pager, a laptop computer with a wireless connection, a personal digital assistant with a wireless connection, a navigational device used to receive signals from satellites, or the like. The antenna system 202 is utilized by the portable communication device 200 for receiving and transmitting radio frequency (RF) signals, such as cellular, WiFi, or WiMAX signals. Transceiver circuitry 204 includes receiver circuitry and transmitter circuitry in a manner familiar to those skilled in the art. The receiver circuitry demodulates and decodes the RF signals to derive information and is coupled to a controller 206 for use in accordance with the function(s) of the portable communication device 200.

The controller 206 also provides information to the transmitter circuitry of the transceiver circuitry 204 for encoding and modulating information onto RF signals for transmission from the antenna system 202. As is well-known in the art, the controller 206 is typically coupled to a memory device 208 and a user interface 210 to perform the functions of the portable communication device 200. Power control circuitry 212 generates and provides appropriate operational voltage and current to, and defines a ground plane 214 for, components of the portable communication device 200, such as the controller 206, the transceiver circuitry 204, the antenna system 202, and/or the user interface 210. In this embodiment, the user interface 210 includes a microphone 216, an earpiece speaker 218, a hands-free speaker 220, a display 222, and one or more key inputs 224, including, for example, a keypad 226. The elements of the portable communication device 200 are enclosed within a housing 228 except for portions of the user interface 210 such as the display 222, the key inputs 224 and the keypad 226.

Figure 2B:
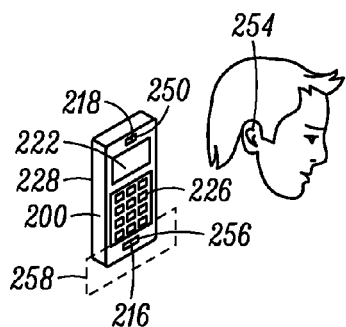
FIG. 2B is a right front top perspective view of a portable communication device as held during use in accordance with the first embodiment.

In accordance with the present embodiment, the earpiece speaker 218 provides audio output for operation of the portable communication device 200 during typical operation. Referring to FIG. 2B, orientation of the portable communication device 200 during typical operation places an opening 250 in the housing 228 of the portable communication device 200 proximate a user's ear 254, the opening 250 providing audio output from the earpiece speaker 218 located behind the opening 250 to the user's ear 254. Similarly, an opening 256 in the housing 228 provides a user's speech as audio input to the microphone 216 located behind the opening 256.

While the antenna system 202 is located in a bottom portion 258 of the housing 252 of the portable communication device 200, such antenna system 202 must be able to reduce the electromagnetic emissions proximate the opening 250 for the earpiece speaker 218 in order to be hearing aid compliant. Referring to FIG. 3A, a rear planar cutaway view 300 of the portable communication device 200 depicts the antenna system 202 in accordance with a first embodiment which utilizes an antenna system design technique wherein the reduced electromagnetic emissions are a result of the antenna design. The antenna system 202 in accordance with the first embodiment includes the ground plane 214 defined by the power control circuitry 212, a first element 302 and a second element 304 mounted within the housing 252. The first element 302 is an active, unbalanced, non-dipole driven element, such as a monopole antenna element, which is designed to resonate within one or more predetermined frequency bands for transmitting and receiving RF signals within the predetermined frequency band(s). Where the portable communication device 200 operates on cellular frequencies, one of the predetermined frequency bands is typically at or near 1900 MHz.

The second element 304 is a non-resonant structure (or at least is non-resonating within the predetermined frequency band(s) where the first antenna element 302 transmits). The antenna volume of the first element 302 is a three-dimensional volume surrounding the first antenna element 302 having X and Y dimensions as shown in FIG. 3A. The X-dimension 306 corresponds to the width of the ground plane and the Y-dimension 308 is defined by dimensions of the first and second elements 302, 304. The second element 304 is located completely or partially within the antenna volume of the first element 302 such that the second element 304 capacitively couples with the first element 302 to create a partial loop response, such as a balanced or pseudo-balanced antenna response. The partial loop response is formed when the driven unbalanced first element 302 couples capacitively to the nonresonant second element 304 while the second element 304 is connected to the ground plane 214 of the portable communication device 200.

Figure 3D:
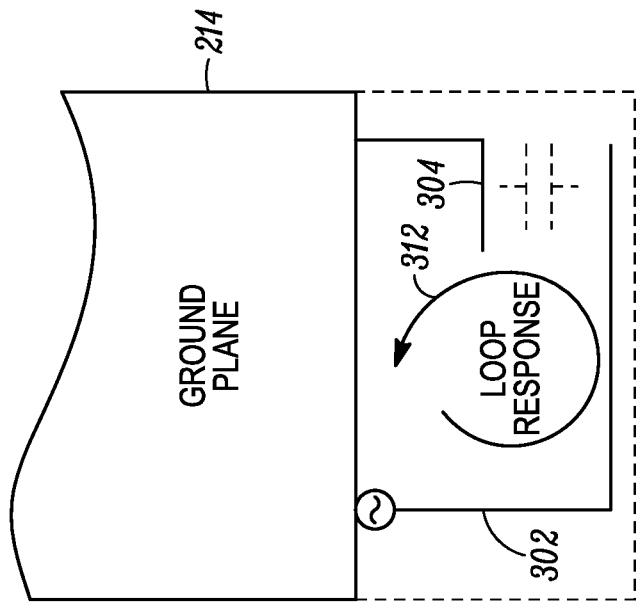
FIG. 3D is a rear planar cutaway view of the portable communication device of FIG. 2B depicting the antenna system of FIG. 3A in accordance with the first embodiment.
Figure 3C:
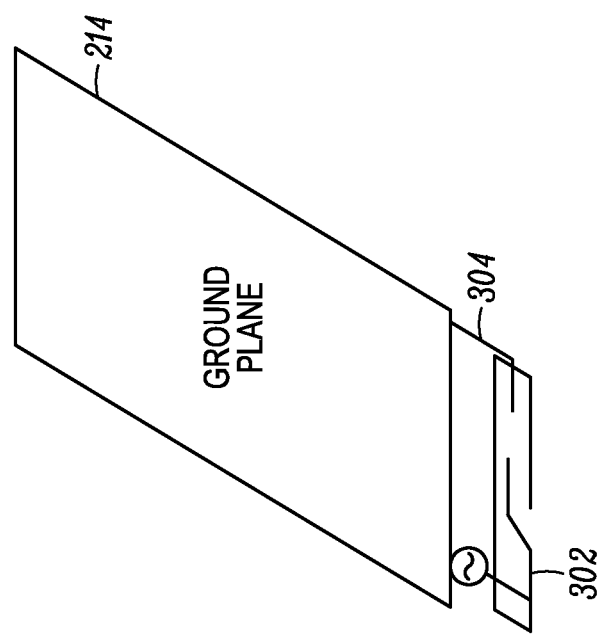
FIG. 3C is a right rear bottom perspective cutaway view of the portable communication device of FIG. 2B depicting the antenna system of FIG. 3A in accordance with the first embodiment.

FIG. 3B is a bottom planar cutaway view of the portable communication device 200 depicting the antenna system 202 including the first element 302, a folded monopole antenna element, and the second element 304, a planar element and showing a Z-dimension 310 of the antenna volume. The first element 302 depicted in FIG. 3B is a folded monopole antenna element such as a folded J antenna element. Referring to FIG. 3C, a three dimensional right rear bottom perspective cutaway view of the portable communication device 200 depicting the antenna system 202 is shown. As depicted in the rear planar cutaway view of FIG. 3D, the second element 304 is proximate to the folded monopole first antenna element 302 and capacitively couples to the first element 302 forming a loop response 312 (i.e., a partial loop response within the antenna volume of the first element 304. The loop 312 created by the first element 302 and the second element 304 has a balanced antenna response at a frequency band of interest. The frequency band of interest is typically the transmit band for the transceiver circuitry 204 (FIG. 2A), such as the GSM 1900 transmit band for a cellular telephone device.

Figure 4A:
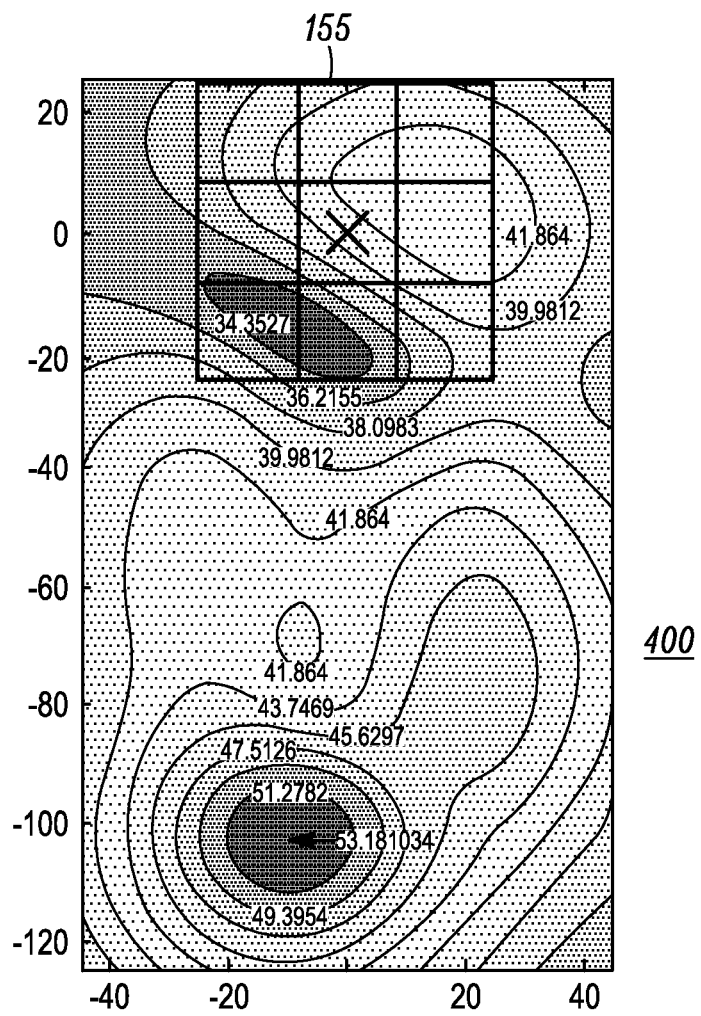
FIG. 4A is an electric field gradient diagram of a normalized radiation pattern of a baseline antenna system for transmitting and receiving radio frequency (RF) at or around 1900 MHz.
Figure 4B:
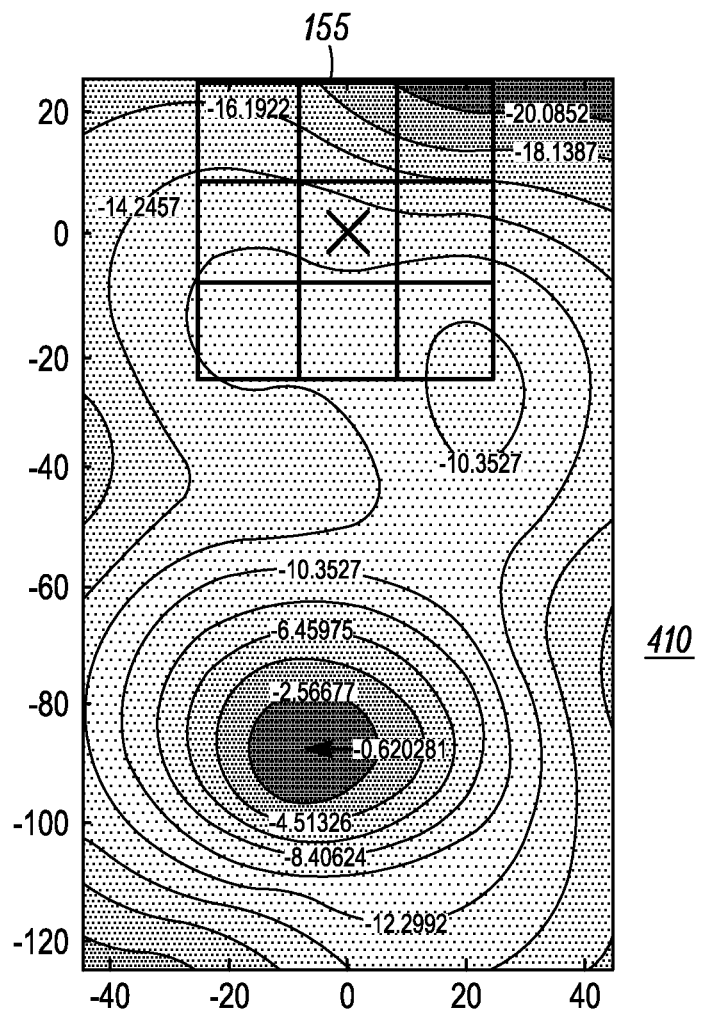
FIG. 4B is a magnetic field gradient diagram of the normalized radiation pattern of a baseline antenna system for transmitting and receiving radio frequency (RF) at or around 1900 MHz.

While the first element 302 depicted in FIGS. 3A to 3D is a folded monopole antenna element, the first element 302 could also be another form of unbalanced antenna element such as an inverted L monopole antenna element or a planar inverted F antenna element. When driven (i.e., transmitting), the first element 302 (isolated from the second element 304) provides an unbalanced response. FIG. 4A depicts an electric field gradient diagram 400 of the unbalanced response of a monopole antenna element, where the asymmetry in the field gradient along the length of the ground plane 214, i.e., the vertical direction of the diagram 400, indicates an unbalanced response. A balanced response of an antenna located at the bottom of the field gradient diagram would create fields symmetrical along a center of the field gradient diagram as seen below in FIG. 5. The electric field gradient diagram 400 is a diagram of a normalized radiation pattern of a baseline antenna system having a monopole antenna for transmitting and receiving radio frequency (RF) at or around 1900 MHz. FIG. 4B depicts a magnetic field gradient diagram 410 of the normalized radiation pattern of the baseline antenna system having the monopole antenna and providing an unbalanced response when transmitting and receiving radio frequency (RF) at or around 1900 MHz.

In the field gradient diagrams 400, 410, the darker region toward the bottom of the diagram indicates the highest fields (electric or magnetic) due to the antenna's location. The gradients between colors decrease from this lower dark region to the lightest region(s) and then decrease further to the dark regions located in the upper part of the diagram. By using the methodology described above in regards to FIGS. 1A and 1B, three of the compliance areas 165 (other than the center compliance area 175) having the highest gradients can be excluded to determine the maximum field generated by the antenna system in the area of the earpiece speaker 218. Thus, the maximum electric field hearing aid compliance gradient for the antenna system producing the electric field gradient diagram 400 is 41.864 dB V/m (since this gradient passes through the center compliance area 175 which cannot be excluded). Likewise, the maximum magnetic field hearing aid compliance gradient for the antenna system producing the magnetic field gradient diagram 410 is −12.2922 dB A/m by excluding the bottom row right compliance area 165 (since the −12.2922 dB A/m magnetic field gradient passes through the non-excludable center compliance area 175).

Figure 5:
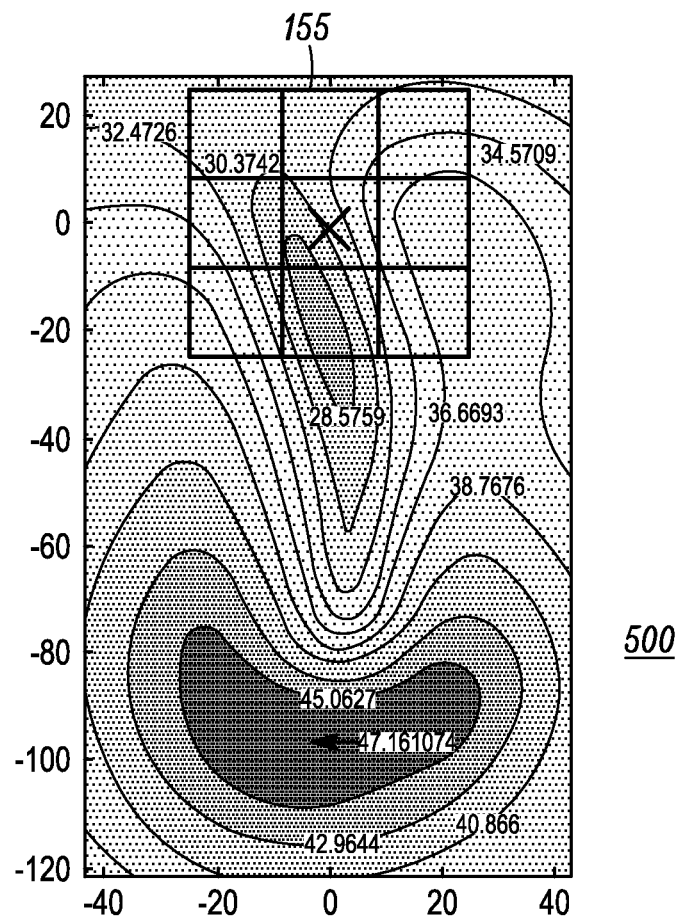
FIG. 5 is an electric field gradient diagram of the balanced antenna response for transmitting and receiving radio frequency (RF) at or around 1900 MHz of the antenna system of FIG. 3A in accordance with the first embodiment.

As described previously, the second element 304 is located within the antenna volume of the first antenna element 302 such that the second element 304 couples with the first antenna element 302 to create a balanced or pseudo-balanced antenna response (i.e., the partial loop response). FIG. 5 shows an electric field gradient diagram 500 of the balanced antenna response for transmitting and receiving radio frequency (RF) at or around 1900 MHz of an antenna system incorporating both the first antenna element 302 and the second antenna element 304. As explained above, the balanced response of an antenna located at the bottom of the field gradient diagram would create fields symmetrical along a center of the field gradient diagram. As can be seen from the electric field gradient diagrams 400, 500, the balanced antenna system which includes the first element 302 and the second element 304 (FIGS. 3A to 3D) provides reduced electrical emissions within the control areas 155. Not only are the differential fields within the control area 155 reduced in the electric field gradient diagram 500 (as compared to the electric field gradient diagram 400), but the magnitudes of the differential fields within the control area 155 are reduced. The maximum electric field hearing aid compliance gradient for the antenna system 202 including the first and second elements 302, 304 and producing the electric field gradient diagram 500 is 36.6693 dB V/m (excluding the bottom row left and right compliance areas 165 and the middle row right compliance area 165), a reduction of 5.195 dB V/m from the unbalanced antenna system including only a first element 302 and exhibiting the electric field gradient diagram 400 (FIG. 4A).

In the antenna system 202 in accordance with the first embodiment, the unbalanced antenna response of the first element 302 and the balanced antenna response of the combination of the first element 302 and the second element 304 provides a quasi-balanced response which incorporates both the unbalanced and the balanced response. This composite response which includes both the unbalanced and the balanced response could be generated by a predetermined structure of and a location of the second element or by an impedance element connected to the second element. The impedance element (not shown) could be connected to the second element 304 to control the partial loop response, with the impedance value of the impedance element predetermined to provide a balanced antenna response within the predetermined frequency band. In this manner, the antenna system 202 can provide a composite response including both the balanced antenna response and an unbalanced antenna response.

Figure 6A:
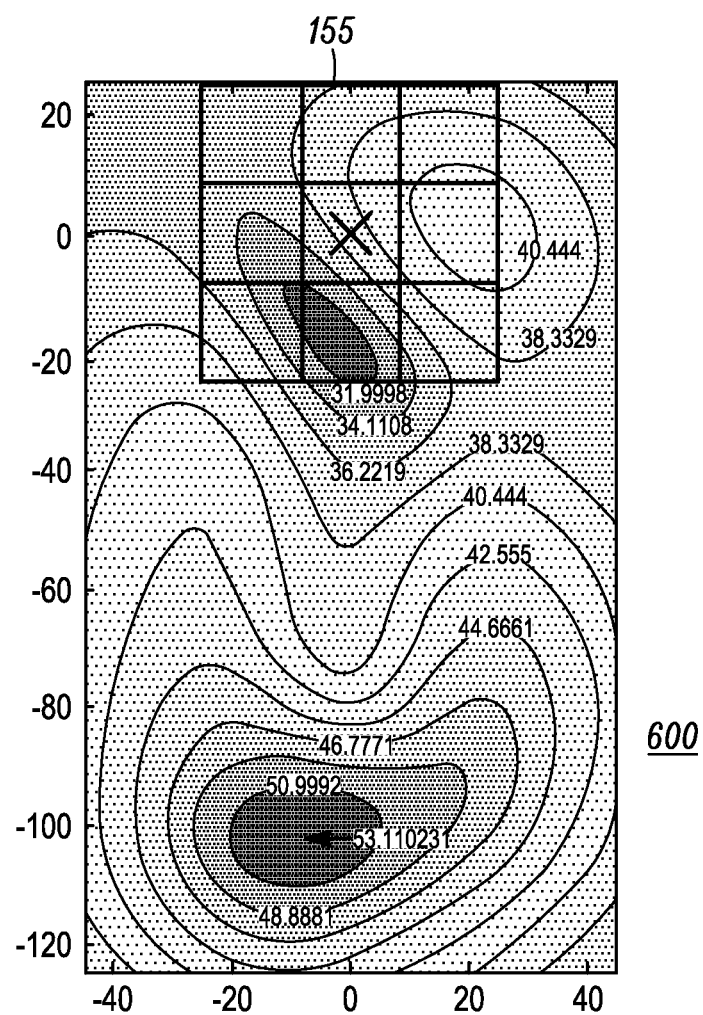
FIG. 6A is an electric field gradient diagram of the composite balanced and unbalanced antenna response for transmitting and receiving radio frequency (RF) at or around 1900 MHz of the antenna system of FIG. 3A in accordance with the first embodiment.
Figure 6B:
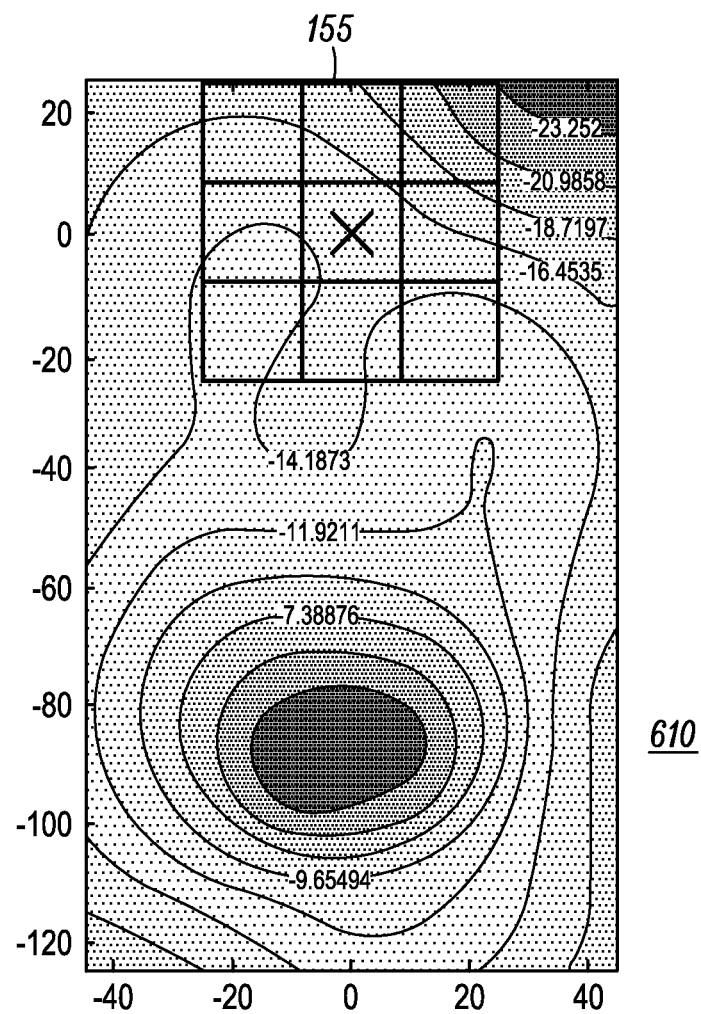
FIG. 6B is a magnetic field gradient diagram of the composite antenna response for transmitting and receiving radio frequency (RF) at or around 1900 MHz of the antenna system of FIG. 3A in accordance with the first embodiment.

Referring to FIG. 6A, an electric field gradient diagram 600 depicts the composite balanced and unbalanced antenna response for transmitting and receiving RF signals at or around 1900 MHz of the antenna system 202 in accordance with the first embodiment, while FIG. 6B depicts a magnetic field gradient diagram 610 of the composite antenna response for transmitting and receiving RF signals at or around 1900

MHz of the antenna system 202 in accordance with the first embodiment. As can be seen when comparing the electric field gradient diagram 600 to the electric field gradient diagram 400 (FIG. 4A) and the magnetic field gradient diagram 610 to the magnetic field gradient diagram 410 (FIG. 4B), the antenna system 202 in accordance with the first embodiment provides reduced electrical and magnetic emissions within the hearing aid compliant control area 155 when transmitting RF signals at or around 1900 MHz (i.e., the maximum electric field hearing aid compliance gradient for the antenna system producing the electric field gradient diagram 600 is 38.3329 dB V/m (since this gradient passes through the center compliance area 175 which cannot be excluded and the top, middle and bottom right compliance areas 165 could all be excluded and the maximum magnetic field hearing aid compliance gradient for the antenna system producing the magnetic field gradient diagram 410 is −14.1873 dB A/m since this magnetic field gradient passes through the non-excludable center compliance area 175).

Figure 7:
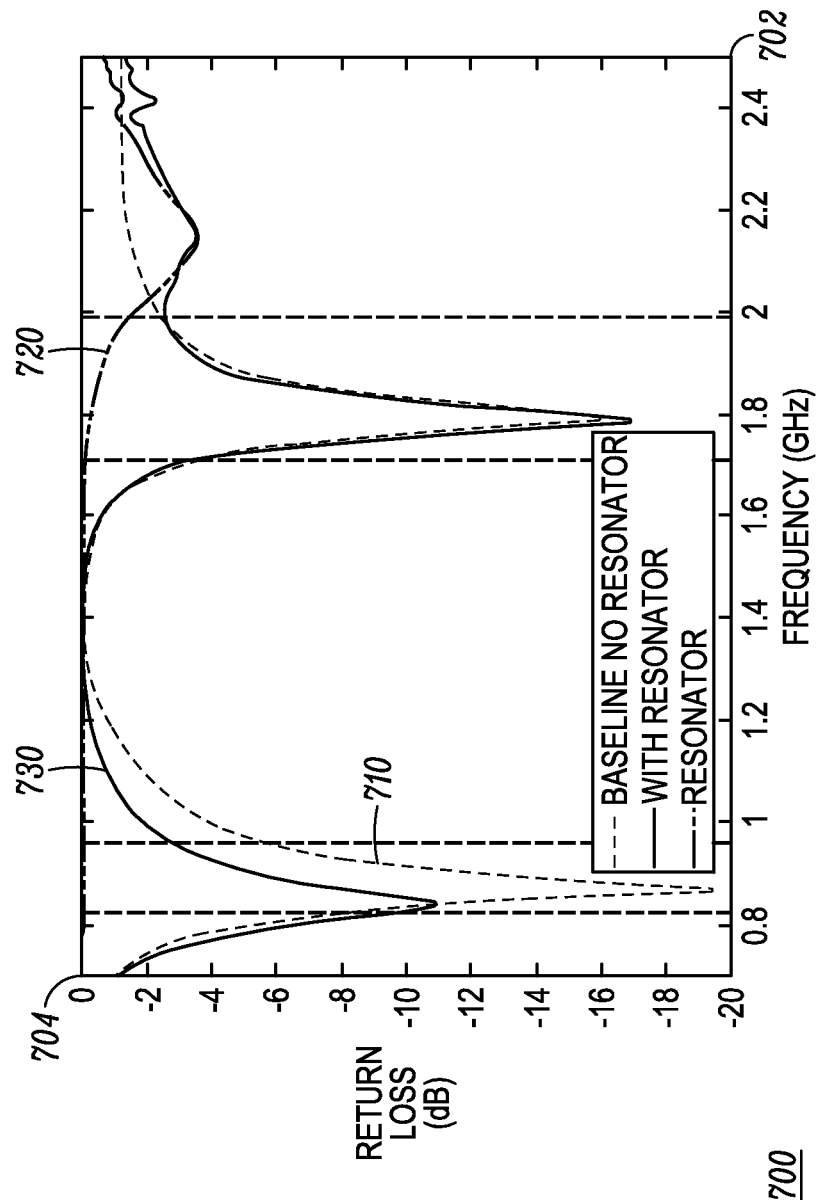
FIG. 7 is a graph of free space return loss of the baseline antenna system having the electromagnetic field gradient response of FIGS. 4A and 4B and the antenna system in accordance with the first embodiment having the electromagnetic field gradient response of FIGS. 6A and 6B.

FIG. 7 shows a graph 700 of free space return loss of the baseline antenna system having the electromagnetic field gradient response of the diagrams 400, 410 and the antenna system 202 in accordance with the first embodiment having the electromagnetic field gradient response of diagrams 600, 610. The frequency (in GHz) is plotted on the abscissa (i.e., the x-axis) 702 and return loss (in negative dB) is plotted on the ordinate (i.e., the y-axis) 704. The free space return loss of the baseline antenna system with only a monopole antenna element is shown on line 710 and has good response at or around the GSM frequency of 850 MHz and the PCS frequency of 1900 MHz, which both are frequencies utilized in many cellular telephone systems. While the second element 304 has a response shown by line 720 which shows that the second element 304 is not resonant within the frequency band of interest around 1800 MHz. The composite response of the first element 302 and the second element 304 is shown by line 730 and also has good response at or around the frequencies of 850 MHz and 1900 MHz. Thus it can be seen that the antenna system 202 in accordance with the first embodiment provides good response at cellular telephone frequencies and will providing reduced electromagnetic emissions in the hearing aid compliance control areas 155 proximate to the earpiece speaker 218.

Figure 8B:
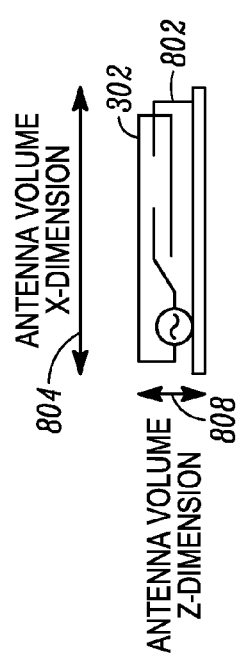
FIG. 8B is a bottom planar cutaway view of the portable communication device of FIG. 2A depicting the antenna system of FIG. 8A in accordance with the second embodiment.
Figure 8C:
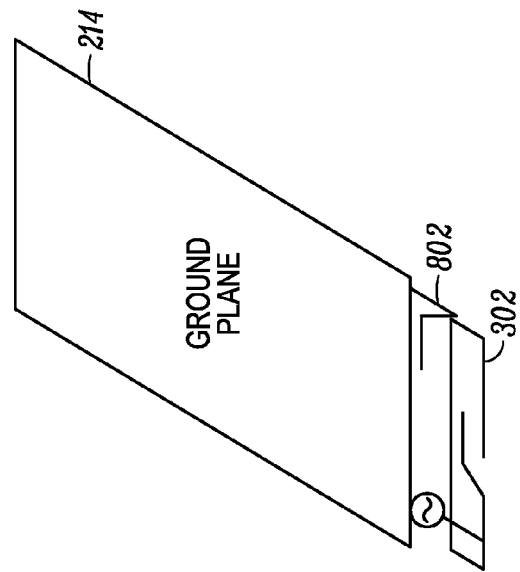
FIG. 8C is a right rear bottom perspective cutaway view of the portable communication device of FIG. 2A depicting the antenna system of FIG. 8A in accordance with the second embodiment.
Figure 8A:
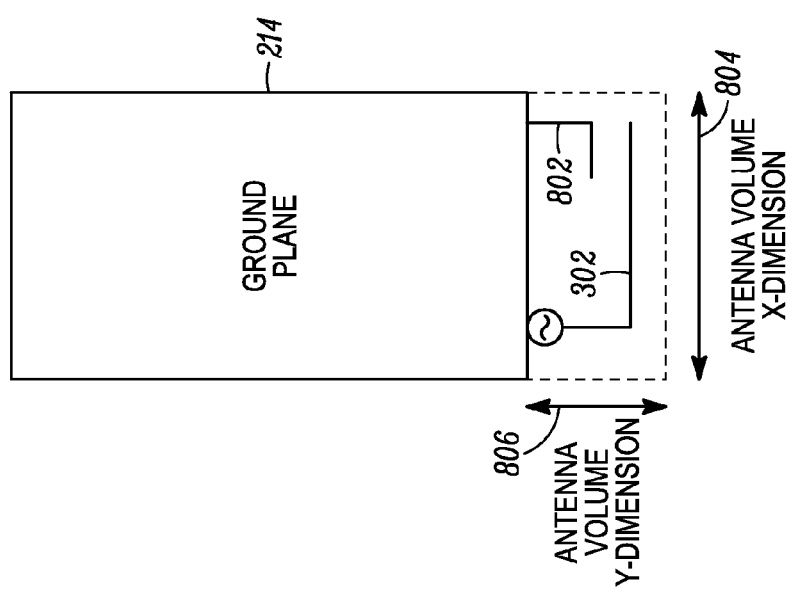
FIG. 8A is a rear planar cutaway view of the portable communication device of FIG. 2 depicting an antenna system in accordance with a second embodiment.

The second element 304 could also include a non-planar element, so long as the second element 304 is non-resonating within the predetermined frequency band of the first element 302 and functions to create a partial loop response when located within the antenna volume of the first antenna element 302. FIG. 8A depicts a rear planar cutaway view of the portable communication device 200 with the antenna system 202 in accordance with a second embodiment wherein a non-planar element 802 replaces the second element 304 from FIGS. 3A to 3D. The antenna volume is proscribed in the rear planar view of FIG. 8A by an X-dimension 804 of the antenna volume and a Y-dimension 806 of the antenna volume. FIG. 8B is a bottom planar cutaway view of the portable communication device 200 and more clearly depicts the non-planar element 802 of the antenna system 202 in accordance with the second embodiment and also depicts a Z-dimension 808 of the antenna volume. FIG. 8C is a three dimensional right rear bottom perspective cutaway view of the antenna system 202 of the portable communication device 200 wherein it can be clearly seen that the second element 802 is a non-planar element.

Figure 9B:
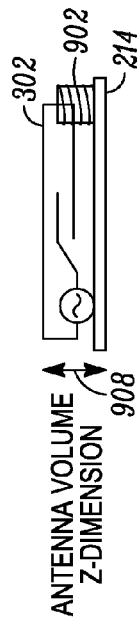
FIG. 9B is a bottom planar cutaway view of the portable communication device of FIG. 2 depicting the antenna system of FIG. 9A in accordance with the third embodiment.
Figure 9C:
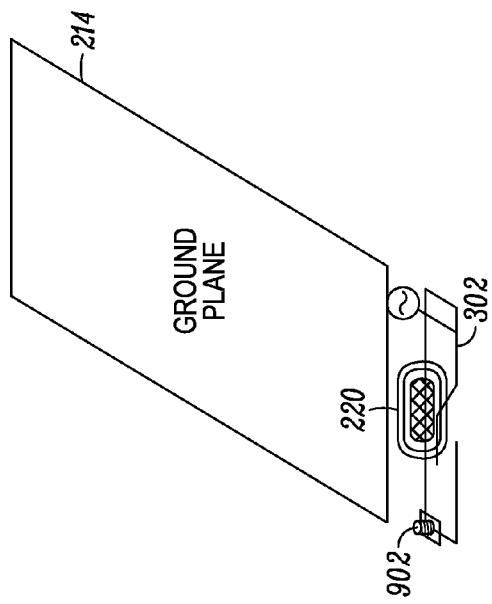
FIG. 9C is a front left bottom perspective cutaway view of the portable communication device of FIG. 2 depicting the antenna system of FIG. 9A in accordance with the third embodiment.
Figure 9A:
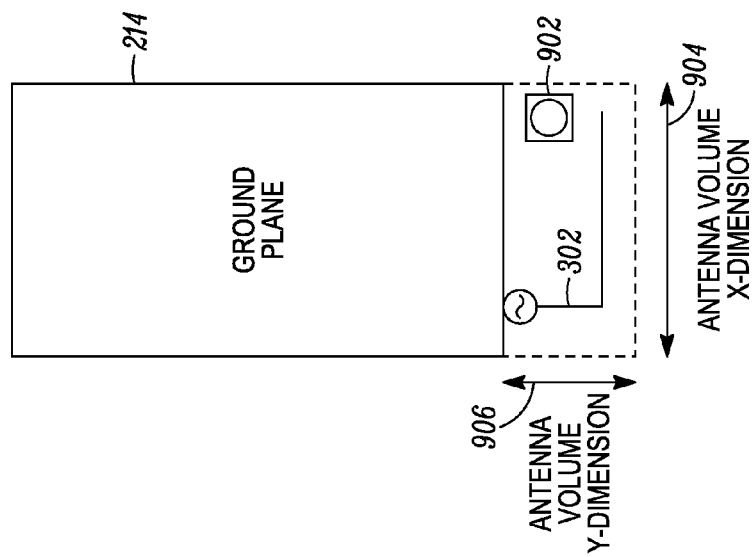
FIG. 9A is a rear planar cutaway view of the portable communication device of FIG. 2 depicting an antenna system in accordance with a third embodiment.

The second element 304 (planar) or 802 (non-planar) could further include a helical coil element (with or without a dielectric core) functioning to create a partial loop response when located within the antenna volume of the first element 302. Referring to FIG. 9A, a rear planar cutaway view of the portable communication device 200 depicts an antenna system 202 in accordance with a third embodiment. A helical coil element 902 replaces the second element 304 from FIGS. 3A and 3B. A X-dimension 904 and a Y-dimension 906 are shown in the rear planar view of FIG. 9A. FIG. 9B is a bottom planar cutaway view of the portable communication device 200 in accordance with the third embodiment and FIG. 9C is a front left bottom perspective cutaway view of the portable communication device 200 in accordance with the third embodiment, with both FIGS. 9B and 9C depicting the helical coil element 902. A Z-dimension 908 of the three dimensional antenna volume is shown in FIG. 9B. As seen in FIG. 9C, the antenna volume is shared by the first element 302, the second element 902 with a helical coil and the hands-free polyphonic speaker 220. In this arrangement, the helical coil second element 902 should be tuned such that both the helical coil second element 902 and the hands-free speaker 220 create a partial loop response within the antenna volume proscribed by the X, Y and Z dimensions 904, 906, 908.

Figure 10:
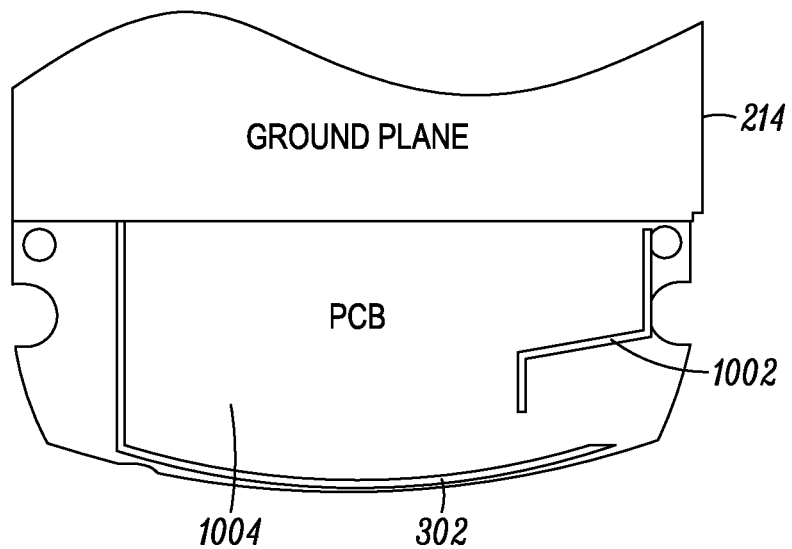
FIG. 10 is a rear planar cutaway view of the portable communication device of FIG. 2 depicting an antenna system in accordance with a fourth embodiment.

FIG. 10 depicts a rear planar cutaway view of the portable communication device 200 depicting an antenna system 202 in accordance with a fourth embodiment wherein the second antenna element is a planar antenna element 1002. The planar element 1002 is printed on a printed circuit board portion 1004 of the portable communication device 200, the printed circuit board portion 1004 located within the antenna volume of the first element 302, having conductive traces printed thereon, and coupled to elements of the portable communication device 200 such as the controller 206 and the transceiver circuitry 204. In this embodiment, the printed circuit board portion 1004 in the antenna volume does not carry ground traces so that it does not form any portion of the ground plane 214. In addition, while the first element 302 is curved and the second element 1002 includes a slanted bend in the fourth embodiment of the portable communication device 200 of FIG. 10, the first and second elements 302, 1002 could also be squared off similar to the first and second elements 302, 304 of FIG. 3A. Those skilled in the art will realize that the capacitive coupling between the first and second elements 302, 304 is a function of the shape and length of the second element 304 and the distance between the first element 302 and the second element 304.

Figure 11:
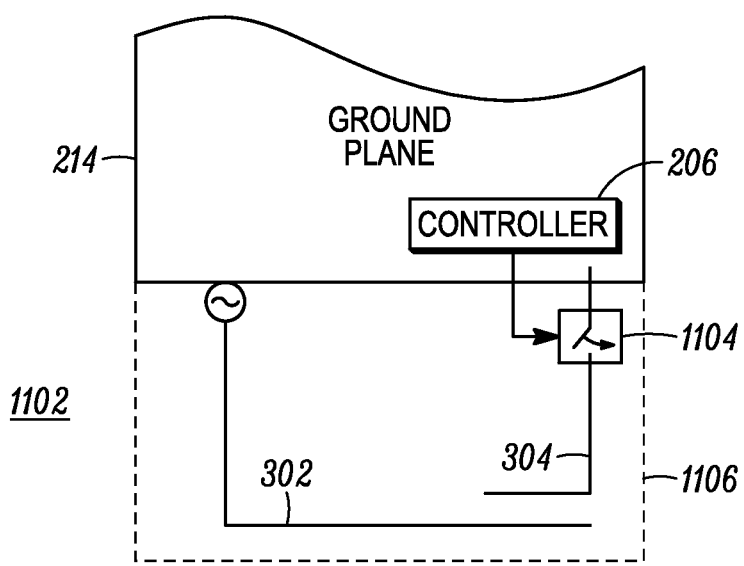
FIG. 11 is a block diagram of a portable communication device including an antenna system in accordance with a fifth embodiment.

Referring to FIG. 11, a block diagram of the portable communication device 200 which includes a rear planar cutaway view depicts an antenna system 1102 in accordance with a fifth embodiment. The antenna system 1102 includes the ground plane 214, the first element 302, and the second element 304 such as that shown in FIGS. 3A and 3B. The antenna system 1102 also includes a switching device 1104. The switching device 1104 is connected between the ground plane 214 and the second element 304 and operates under the control of the controller 206. An engage signal from the controller 206 closes the switch 1104 to connect the second element 304 to the ground plane 214 so that the second element 304 creates the partial loop response within the antenna volume of the first element 302. A disengage signal from the controller 206 opens the switch 1104 to disconnect the second element 304 from the ground plane 214. The controller 206 provides the engage and disengage signals so that the functionality of the first element 302 is reduced (i.e., the electromagnetic emissions of the first element 302 are reduced) only for hearing aid compliant operation during transmission of RF signals from the first element 302. More specifically, the controller 206 generates the engage signal and provides the engage signal to the switching device 1104 when the controller 206 provides signals to the transmitter circuitry of the transceiver circuitry 204 for modulation and subsequent transmission from the antenna system 1102 as RF signals. The controller 206 generates and provides the disengage signal to the switching device 1104 when the controller 206 is not providing signals to the transmitter circuitry for modulation. Further logic could be added to the controller 206 to open and close the switch 1104 in response to the frequency band of operation (e.g., the 1900 MHz GSM frequency band).

Figure 12:
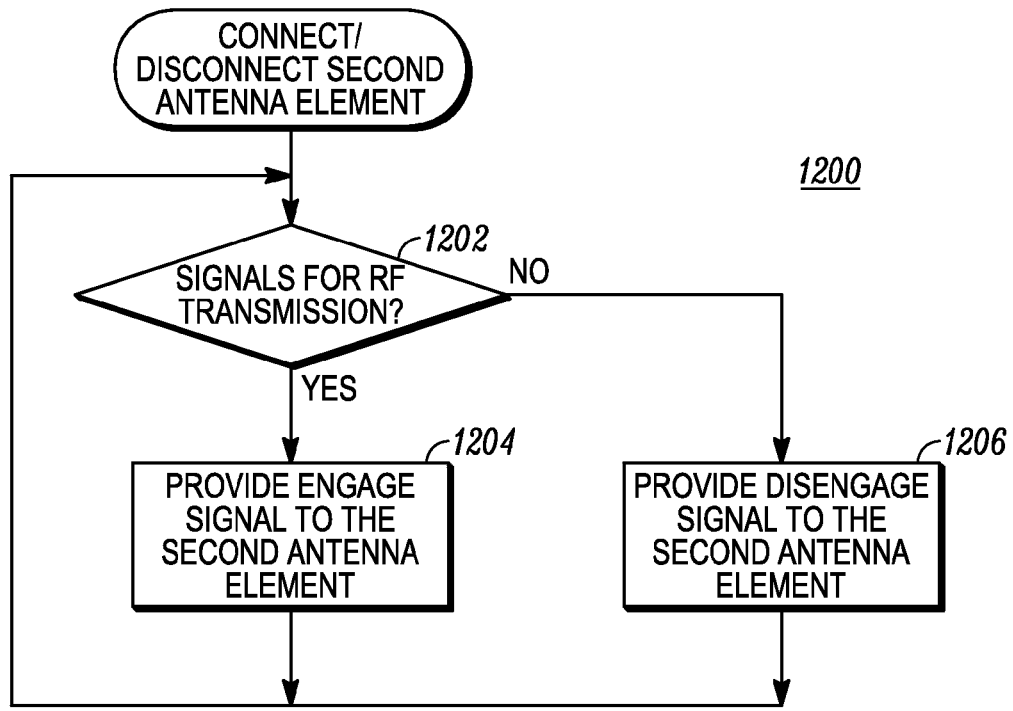
FIG. 12 is a flowchart depicting operation of the portable communication device of FIG. 11 in accordance with the fifth embodiment of the antenna system depicted therein.

Referring to FIG. 12, a flowchart 1200 illustrates an exemplary method for controlling the antenna system 1102 in accordance with the fifth embodiment by providing engage and disengage signals to the switching device 1104 for operation of the switching device 1104 under the control of the controller 206. The method for controlling the antenna system 1102 begins by the controller 206 determining 1202 whether signals are being provided from the controller 206 to the transceiver circuitry 204 for modulation by the transmitter circuitry and transmission as RF signals from the first element 302 of the antenna system 202. In accordance with the fifth embodiment, the controller 206 provides 1204 an engage signal to the switching device 1104 to connect th ground plane 214 to the second element 304 to create a partial loop response within the antenna volume of the first element 302 when the controller 206 provides signals for transmission from the first element 302 as radio RF signals modulated at a frequency or frequencies within the predetermined frequency bands.

If the controller 206 determines 1202 that it is not providing signals for transmission from the first antenna element 302 as radio RF signals modulated at a frequency or frequencies within the predetermined frequency band, the controller 206 provides 1206 a disengage signal to the switching element 1104 to disconnect the second element 304 from the ground plane 214 to capacitively disengage the second element 304 from the first element 302. In this manner, the second element 304 reduces electromagnetic emissions of the first element 302 to reduce hearing aid interference only when the first antenna element 302 is transmitting RF signals within the predetermined frequency band.

Figure 13:
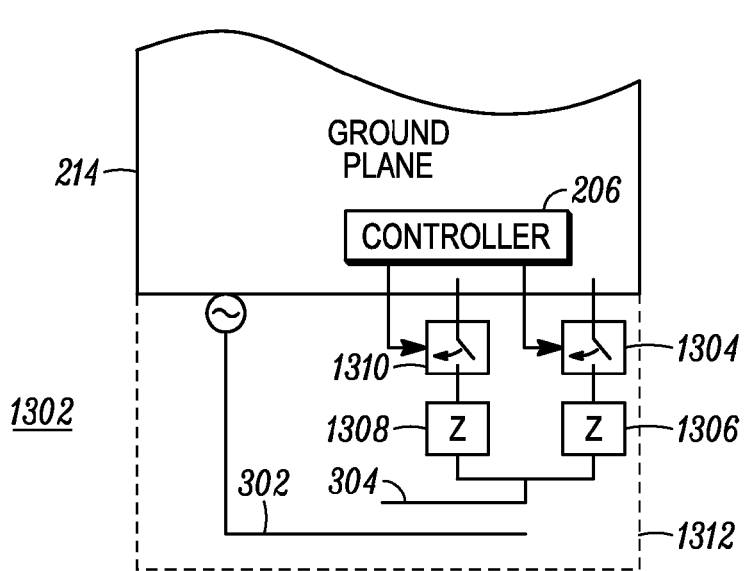
FIG. 13 is a block diagram of a portable communication device including an antenna system in accordance with a sixth embodiment.

Referring next to FIG. 13, a rear planar cutaway view shows an antenna system 1302 in accordance with a sixth embodiment. The antenna system 1302 includes the first element 302 and the second element 304. The antenna system 1302 also includes a first switching device 1304 coupled to the second element 304 through a first impedance element 1306 and a second switching device 1310 coupled to the second element 304 through a second impedance element 1308. The first impedance element 1306 has an impedance value predetermined to provide a balanced antenna response of the antenna system 1302 within a first frequency band. The second impedance element 1308 has an impedance value predetermined to provide a balanced antenna response of the antenna system 1302 within a second frequency band. The ground plane 214 is coupled to both the first switching device 1304 and the second switching device 1310. The controller 206 is also coupled to both the first switching device 1304 and the second switching device 1310 for selectably connecting and disconnecting the second element 304 to and from the ground plane 214.

A first frequency band engage signal is provided from the controller 206 to the first switching device 1304 to connect the second element 304 and the first impedance element 1306 with the ground plane 214 to provide a balanced antenna response of the antenna system 1302 within the first frequency band when RF signals within the first frequency band are being transmitted from the first element 302. A second frequency band engage signal is provided from the controller 206 to the second switching device 1310 to connect the second element 304 and the second impedance element 1308 to the ground plane 214 to provide a balanced antenna response of the antenna system 1302 within the second frequency band when RF signals within the second frequency band are being transmitted from the first element 302. Disengage signals are provided from the controller 206 to the first and second switching devices for selectable disconnecting the second element 304 and the first and second impedance elements 1306, 1310 from the ground plane 214.

In addition, a favorable impedance for providing a balanced antenna response in a third frequency band can be achieved by the controller 206 providing engage signals to both the first and second switching devices 1304, 1310 to connect the second element 304 through the first and second impedance devices 1306, 1308. Thus when the first element 302 is a folded monopole antenna element, the second element 304 and the switching elements 1304, 1310 allow capacitive coupling within one to three intended frequency band(s). If the intended band(s) is a single high frequency band such as for DCS or PCS, the preferred coupling of the second element 304 to form the partial loop response within the antenna volume of the first element 302 requires using the first switching element 1304 and the first impedance device 1306. However, if the intended band(s) is a single low frequency band for e.g., AMPS or GSM, the preferred coupling of the second element 304 to form the partial loop response within the antenna volume of the first element 302 requires using the second switching element 1310 and the second impedance device 1308. For coupling to utilize either one or both of the high band and low band, the controller 206 uses both switching devices 1304, 1310 to couple through both of the impedance devices 1306, 1308. In addition, when choosing impedance values and selecting frequency bands, there is more parameters for determining frequency band choice than just the position of the first and/or second element 302, 304. Also, there will always be some coupling in unintended frequency bands.

Figure 14:
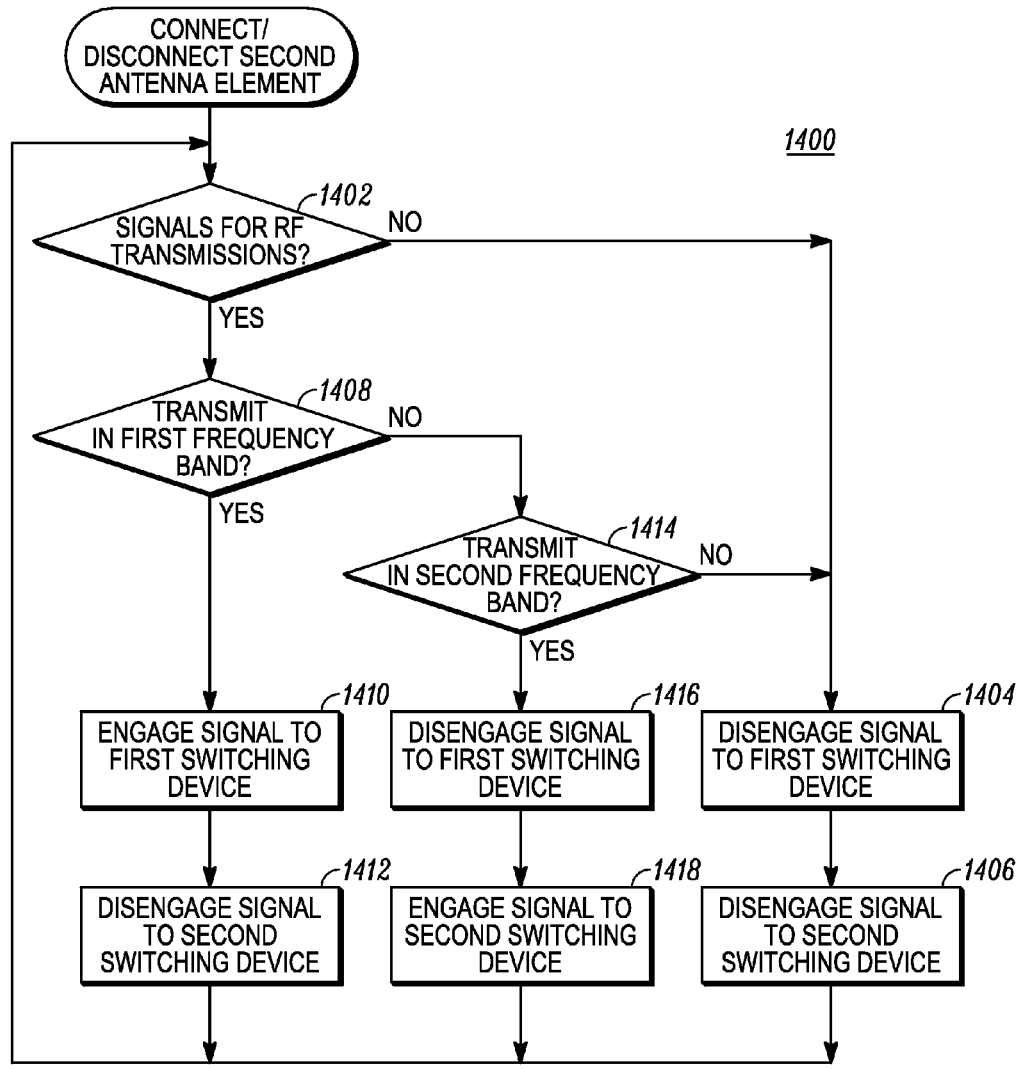
FIG. 14 is a flowchart depicting operation of the portable communication device of FIG. 13 in accordance with the sixth embodiment of the antenna system depicted therein.

FIG. 14 is a flowchart 1400 depicting operation of the portable communication device 200 in accordance with the sixth embodiment such as shown in FIG. 13, the controller 206 providing engage and disengage signals to the first and second switching devices 1304, 1310 for control of the second element 304. The method for tuning the antenna system 1302 begins by the controller 206 determining 1402 whether signals are being provided from the controller 206 to the transceiver circuitry 204 for modulation by the transmitter circuitry and subsequent transmission as RF signals from the first element 302. In accordance with the sixth embodiment, when no RF signals are being transmitted from the first element 302, the controller 206 provides 1404 a disengage signal to the first switching device 1304 and provides 1406 a disengage signal to the second switching device 1310.

If the controller determines 1402 that signals are being provided to the transceiver circuitry 204 for transmission as RF signals from the first element 302, the controller 206 next determines 1408 if the signals are being provided to the transceiver circuitry 204 for transmission within the first frequency band from the first element 302. If it is determined 1408 that the signals are being provided to the transceiver circuitry 204 for transmission from the first element 302 as RF signals within the first frequency band, the controller 206 provides 1410 an engage signal to the first switching device 1304 and provides 1412 a disengage signal to the second switching device 1310.

If it is determined 1408 that the signals are not being provided to the first element 302 for transmission therefrom as RF signals within the first frequency band, the controller 206 determines 1414 if the signals are being provided to the transceiver circuitry 204 for transmission within the second frequency band. If it is determined 1414 that the signals are being provided to the transceiver circuitry 204 for transmission from the first element 302 as RF signals within the second frequency band, the controller 206 provides 1416 a disengage signal to the first switching device 1304 and provides 1418 an engage signal to the second switching device 1310. If, on the other hand, the controller 206 determines 1414 that the signals are not being provided to the transceiver circuitry 204 for transmission from the first element 302 as RF signals within the second frequency band, the controller 206 provides 1404 a disengage signal to the first switching device 1304 and provides 1406 a disengage signal to the second switching device 1310.

In this manner, in accordance with the sixth embodiment, the second element 304 is engaged along with one of the impedance elements 1306, 1308 to reduce electromagnetic emissions of the first element 302 in order to reduce hearing aid interference within the first frequency band only when the first element 302 is transmitting RF signals within the first frequency band and to reduce hearing aid interference within the second frequency band only when the first element 302 is transmitting RF signals within the second frequency band.

Figure 15:
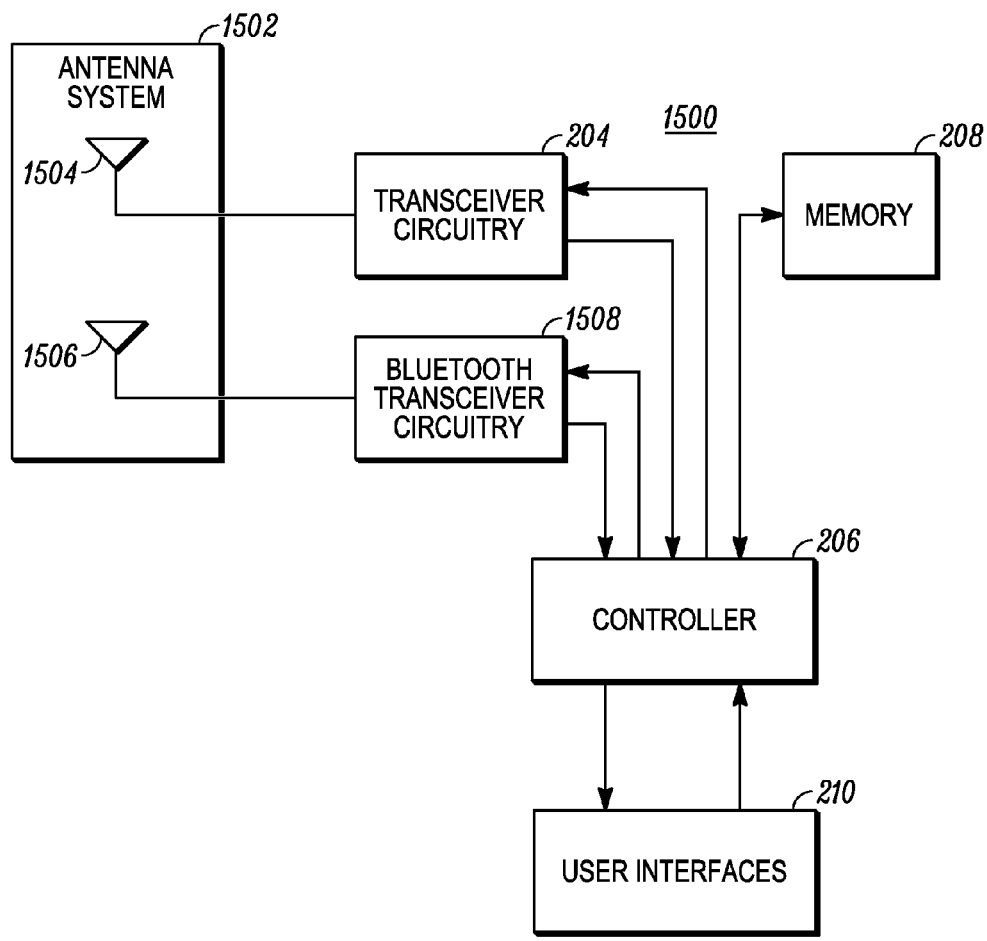
FIG. 15 is a block diagram of a portable communication device including an antenna in accordance with a seventh embodiment.

Referring next to FIG. 15, a block diagram of a portable communication device 1500 includes a Bluetooth antenna in accordance with a seventh embodiment. The portable communication device 1500 in accordance with the seventh embodiment utilizes an antenna system 1502 with an unbalanced antenna element, such as a folded monopole antenna 1504, as a first element for providing both a wide bandwidth response and hearing aid compliance within cellular frequency bands such as 800 MHz and 1900 MHz. The antenna system 1502 is utilized by the portable communication device 1500 for both receiving and transmitting RF signals in a first frequency band, such as 800 MHz and 1900 MHz, via the folded monopole antenna element 1504 and receiving and transmitting RF signals in a Bluetooth frequency band, such as 2.4 GHz, via a Bluetooth antenna 1506 functioning as a second element of the antenna system 1502. First transceiver circuitry 204 includes receiver circuitry and transmitter circuitry for operation in the first frequency band (wherein the first frequency band does not include frequencies of the Bluetooth frequency band) and is coupled to the controller 206 and the first element 1504. Second transceiver circuitry 1508 includes receiver circuitry and transmitter circuitry for operation in the Bluetooth frequency band and is coupled to the controller 206 and the second element 1506.

Figure 16:
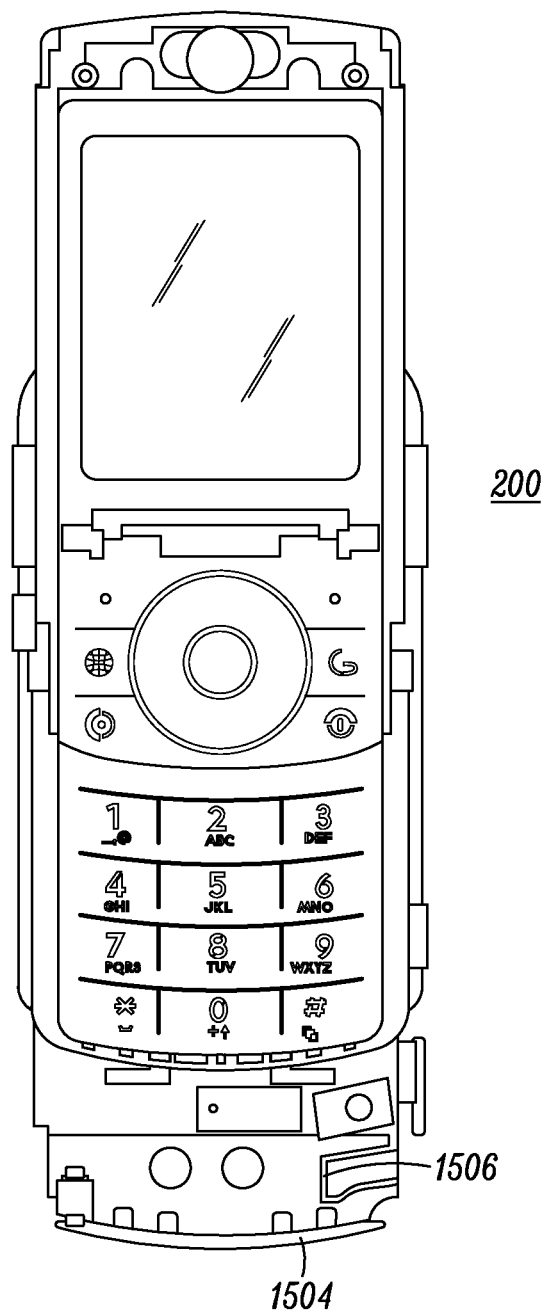
FIG. 16 is a front planar cutaway view of the portable communication device of FIG. 15 depicting the antenna system in accordance with the seventh embodiment including an additional Bluetooth antenna element.

FIG. 16 is a front planar cutaway view of the portable communication device 200 in accordance with the seventh embodiment. The first element 1504 is a folded monopole antenna element and resonates within the first frequency band for transmitting and receiving RF signals modulated at one or more frequencies within the first frequency band (i.e., a cellular frequency band). The second element 1506 is non-resonating within the first frequency band and located within an antenna volume of the first element 1504 to create a partial loop response within the antenna volume for reduction of electromagnetic emissions of the RF signals transmitted from the first element 1504 to reduce hearing aid interference. The second element 1506 resonates within a second frequency band, such as the Bluetooth frequency band of 2.4 GHz, for transmitting and receiving RF signals modulated at one or more frequencies within the second frequency band. Thus, the second element 1506 provides dual functionality. With appropriate optimization of parameters such as shape, length and distance from each other, of the first and second elements capacitive coupling can be achieved for operation in accordance with the embodiment by creating a partial loop response within the antenna volume of the first element 1504.

Figure 17A:
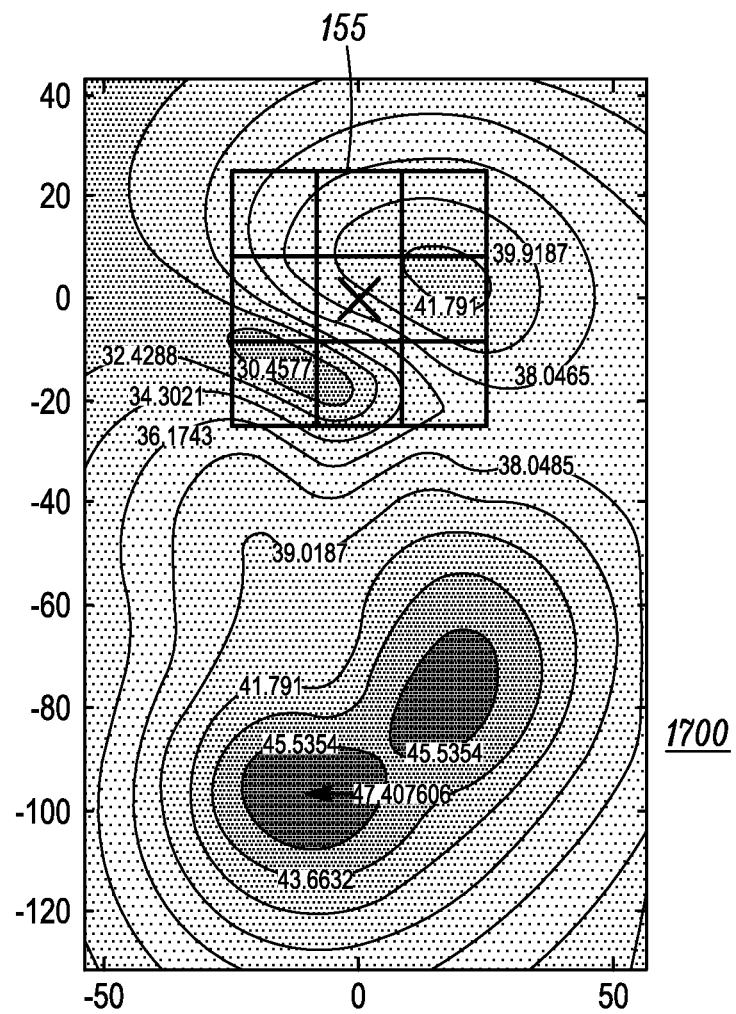
FIG. 17A is an electric field gradient diagram of a radiation pattern of an antenna system for transmitting and receiving RF signals at or around 1880 MHz without an additional Bluetooth antenna element.
Figure 17B:
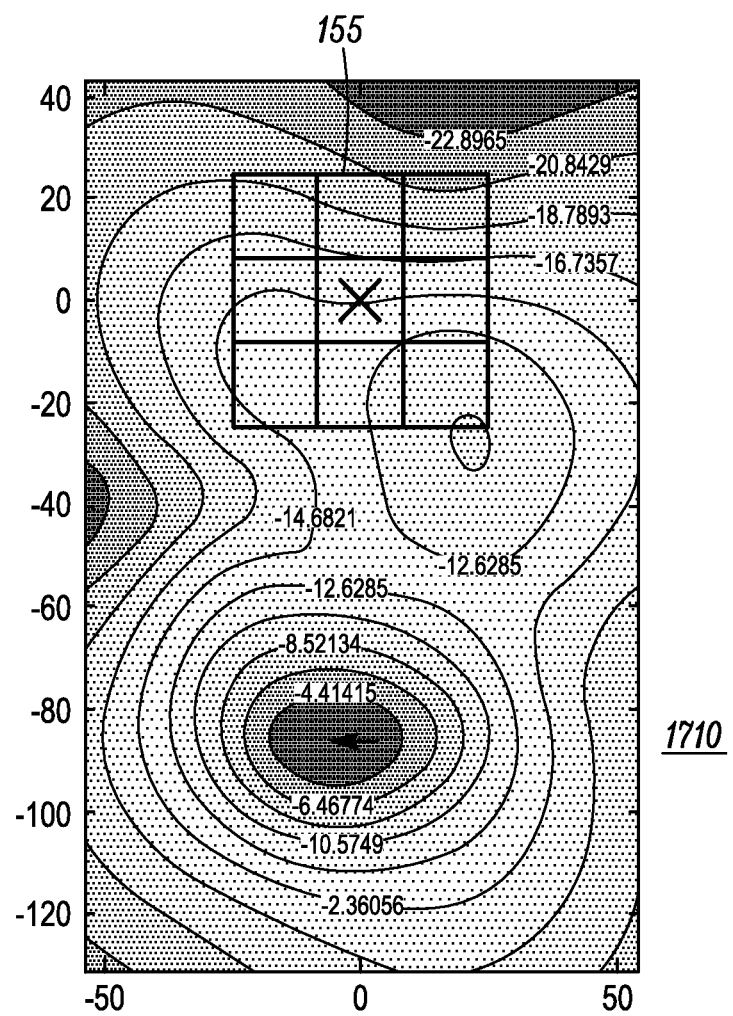
FIG. 17B is a magnetic field gradient diagram of the radiation pattern of the antenna system for transmitting and receiving RF signals at or around 1880 MHz without the additional Bluetooth antenna element.

FIG. 17A is an electric field gradient diagram 1700 of a radiation pattern of an antenna system for transmitting and receiving RF signals at or around 1880 MHz without a Bluetooth antenna element in the antenna volume, while FIG. 17B is a magnetic field gradient diagram 1710 of the radiation pattern of the antenna system for transmitting and receiving RF signals at or around 1880 MHz without the additional Bluetooth antenna element in the antenna volume. The maximum electric field hearing aid compliance gradient for the antenna system producing the electric field gradient diagram 1700 is 39.9187 dB V/m (since this gradient passes through the center compliance area 175 which cannot be excluded and the top and middle right compliance areas 165 could be excluded). The maximum magnetic field hearing aid compliance gradient for the antenna system producing the magnetic field gradient diagram 1710 is −14.6821 dB A/m since this magnetic field gradient passes through the non-excludable center compliance area 175 and the middle right and the bottom center and right compliance areas 165 are excludable.

Figure 18A:
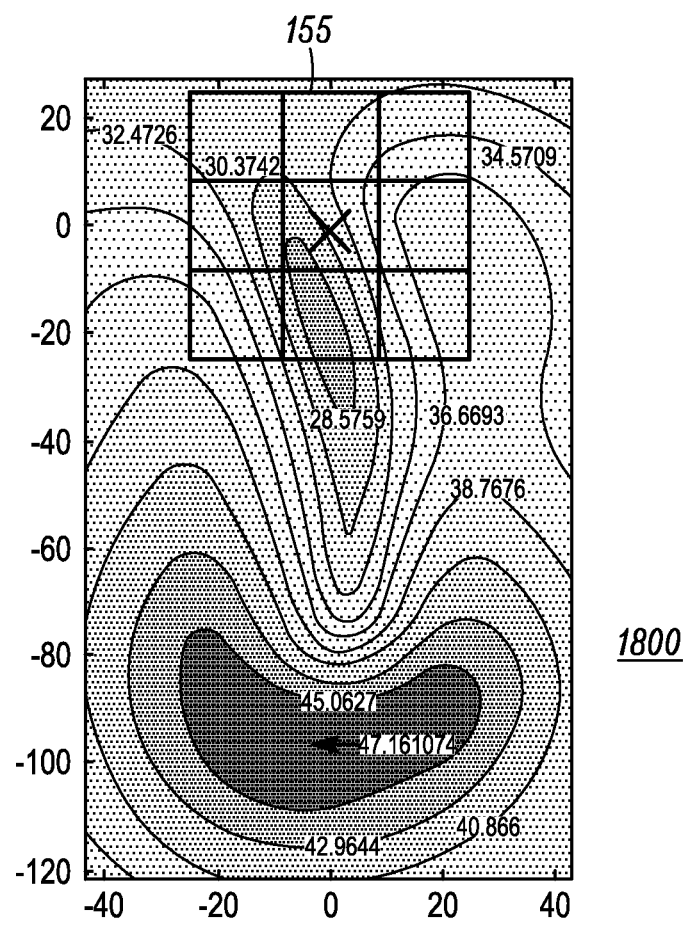
FIG. 18A is an electric field gradient diagram of the antenna response for transmitting and receiving RF signals at or around 1880 MHz of the antenna system of FIG. 16 in accordance with the seventh embodiment including the additional Bluetooth antenna element.
Figure 18B:
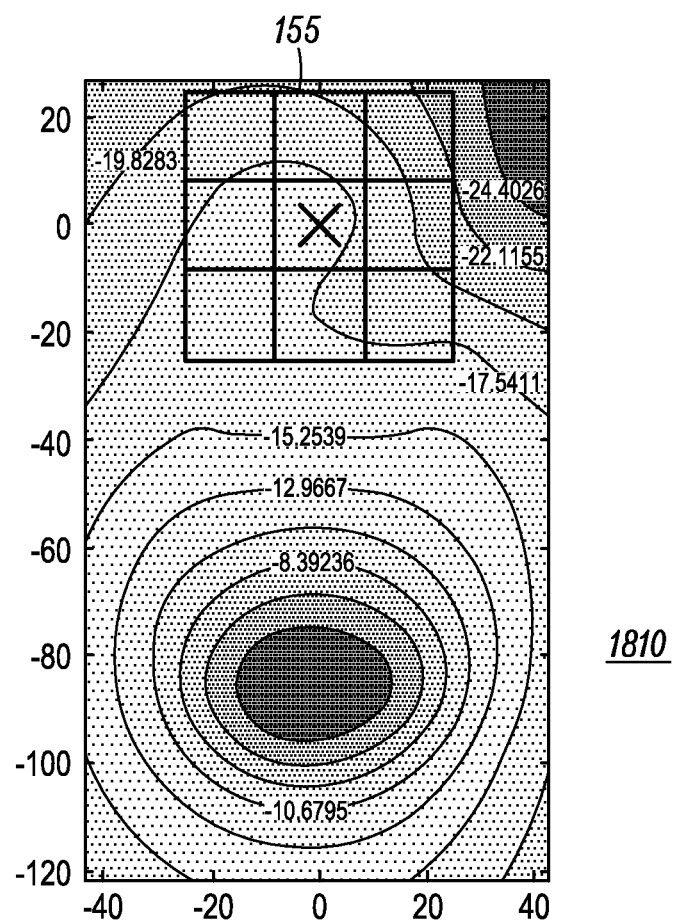
FIG. 18B is a magnetic field gradient diagram of the composite antenna response for transmitting and receiving RF signals at or around 1880 MHz of the antenna system of FIG. 16 in accordance with the seventh embodiment including an additional Bluetooth antenna element.

For comparison therewith, FIG. 18A is an electric field gradient diagram 1800 of the antenna response of the antenna system 1502 in accordance with the seventh embodiment wherein the first element 1504 transmits and receives RF signals at or around 1880 MHz and the second element 1506 is a Bluetooth antenna element for transmitting and receiving RF signals at the Bluetooth frequency band at 2.5 GHz, and FIG. 18B is a magnetic field gradient diagram 1810 of the composite antenna response for transmitting and receiving RF signals at or around 1880 MHz of the antenna system 1502 in accordance with the seventh embodiment wherein the second element 1506 is a Bluetooth antenna element. As can be seen from the comparison, tuning the antenna assembly 1502 within the frequency band at or around 1880 MHz in accordance with the seventh embodiment provides reduced RF emissions within the control area 155 even when the second antenna element 1506 can function as a Bluetooth antenna element. The maximum electric field hearing aid compliance gradient for the antenna system producing the reduced electric field gradient diagram 1800 is 34.5709 dB V/m when excluding the three right compliance areas 165 (as compared with 39.9187 dB V/m of FIG. 17A). Similarly, the maximum magnetic field hearing aid compliance gradient for the antenna system producing the magnetic field gradient diagram 1810 is −17.5441 dB A/m since this magnetic field gradient passes through the non-excludable center compliance area 175 (as compared with −17.6821 dB V/m of FIG. 17B).

Thus it can be seen that methods and apparati have been disclosed which advantageously provides a tunable antenna system in a portable communication device which produces reduced electric field and magnetic field behavior near an earpiece speaker of the portable communication device without significantly impacting the transmission and reception efficiency of the portable communication device. In this manner, a hearing aid compliant portable communication device is provided which reduces electromagnetic emissions at or near the earpiece speaker without reducing operation of the portable communication device's antenna system. While at least one exemplary embodiment has been presented in the foregoing detailed description of the invention, it should be appreciated that a vast number of variations exist.

In addition, in this document, relational terms such as first and second, top and bottom, and the like are used solely to distinguish one entity or action from another entity or action without necessarily requiring or implying any actual such relationship or order between such entities or actions. The terms "includes", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "includes . . . a" does not, without more constraints, preclude the existence of additional identical elements in the process, method, article, or apparatus that comprises the element.

It will also be appreciated that embodiments of the invention described in this document may include one or more conventional processors or controllers and unique stored program instructions that control the one or more controllers to implement, in conjunction with certain non-controller circuits, some, most, or all of the functions of the portable communication device described (where the non-controller circuits may include an RF receiver and/or transceiver, clock circuits, power source circuits, and user input/output devices). As such, these functions may be interpreted as steps of a method to perform antenna tuning of the portable communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could also be used.

Thus, antenna systems for a portable communication device in accordance with the embodiments have been described herein as well as methods and means for tuning the antenna system in accordance with the embodiments. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An antenna system comprising:
   a ground plane;
   an first element comprising a driven unbalanced antenna element resonating within at least one predetermined first frequency band and transmitting and receiving radio frequency (RF) signals modulated at one or more frequencies within the at least one predetermined first frequency band; and
   a second element located within an antenna volume of the first element, the second element non-resonating within the at least one predetermined first frequency band and creating a partial loop response within the antenna volume of the first element by capacitively coupling to the first element when connected to the ground plane, wherein the second element comprises a driven antenna element resonating within a predetermined second frequency band for transmitting and receiving RF signals modulated at one or more frequencies within the predetermined second frequency band, the at least one predetermined first frequency band not including the predetermined second frequency band.

2. The antenna system in accordance with claim 1, wherein the second element includes an element selected from the group of elements comprising:
   a planar element, a non-planar element, a helical coil element, and a helical coil element including a dielectric core.

3. The antenna system in accordance with claim 1 further comprising
   an impedance element connected to the second element.

4. The antenna system in accordance with claim 3, wherein the impedance element has an impedance value associated therewith, the impedance value predetermined to provide a balanced antenna response within the at least one predetermined first frequency band, the antenna system thereby providing a composite response including both the balanced antenna response and an unbalanced antenna response.

5. The antenna system in accordance with claim 1, wherein the second element is located in relation to the first element to reduce electromagnetic fields of the RF signals transmitted by the first element.

6. The antenna system in accordance with claim 1, wherein the first element comprises an antenna element selected from the group of antenna elements including a monopole antenna, an inverted L monopole antenna element, a folded monopole antenna element, a folded J monopole antenna element, and a planar inverted F antenna.

7. The antenna system in accordance with claim 6, wherein the at least one predetermined first frequency band includes a higher frequency band and a lower frequency band, and wherein the first element comprises a folded monopole antenna element, and wherein the second element is proximate the first antenna element in the antenna volume of the first element and capable of forming a first resonant structure when resonating within the higher frequency band and forming a second resonant structure when resonating within the lower frequency band, the first resonant structure having a first impedance value and the second resonant structure having a second impedance value.

8. The antenna system in accordance with claim 1 further comprising a first switching device coupled to the second element for connecting the second element to the ground plane to create the partial loop response within the antenna volume of the first element when the first element is selected to transmit RF signals modulated at one or more frequencies within the at least one predetermined first frequency band and disconnecting the second element from the ground plane when the first antenna element is selected to receive RF signals modulated at one or more frequencies within the at least one predetermined first frequency band.

9. The antenna system in accordance with claim 1, wherein the at least one predetermined first frequency band includes a first frequency band and a second frequency band, the antenna system further comprising:
   a first switching device coupled to the second element for connecting the second element to the ground plane to create the partial loop response within the antenna volume of the first element when the first element is selected to transmit or receive RF signals modulated at one or more frequencies within the first frequency band and disconnecting the second element from the ground plane when the first element is selected to transmit or receive RF signals modulated at one or more frequencies outside the first frequency band; and a second switching device coupled to the second element for connecting the second element to the ground plane to create the partial loop response within the antenna volume of the first element when the first element is selected to transmit or receive RF signals modulated at one or more frequencies within the second frequency band and disconnecting the second antenna element from the ground plane when the first element is selected to transmit or receive RF signals modulated at one or more frequencies outside the second frequency band.

10. The antenna system in accordance with claim 9, wherein the first switching device selectably connects the second antenna element to the ground plane to create the partial loop response within the antenna volume of the first element when the first element is selected to transmit RF signals modulated at one or more frequencies within the first frequency band and disconnects the second element from the ground plane when the first element is selected to receive RF signals modulated at one or more frequencies within the first frequency band.

11. The antenna system in accordance with claim 10, wherein the first switching device further disconnects the second element from the ground plane when the first element is selected to transmit and receive RF signals modulated at one or more frequencies outside the first frequency band.

12. The antenna system in accordance with claim 9, wherein the second switching device selectably connects the second element to the ground plane to create the partial loop response within the antenna volume when the first element is selected to transmit RF signals modulated at one or more frequencies within the second frequency band and disconnects the second element from the ground plane when the first element is selected to receive RF signals modulated at one or more frequencies within the second frequency band.

13. The antenna system in accordance with claim 12, wherein the second switching device further disconnects the second element from the ground plane when the first element is selected to transmit and receive RF signals modulated at one or more frequencies outside the second frequency band.

14. A method for tuning an antenna system to communicate within at least one predetermined frequency band, the antenna system comprising a ground plane, a first element and a second element, the first element comprising a driven unbalanced antenna element resonating within the at least one predetermined first frequency band and the second element comprising an element non-resonating within the at least one predetermined first frequency band and located within an antenna volume of the first element, wherein the second element comprises a driven antenna element resonating within a predetermined second frequency band for transmitting and receiving RF signals modulated at one or more frequencies within the predetermined second frequency band, the at least one predetermined first frequency band not including the predetermined second frequency band, the method comprising the steps of:

connecting the second element to the ground plane to create a partial loop response within the antenna volume of the first element when the first element transmits radio frequency (RF) signals modulated at one or more frequencies within the at least one predetermined first frequency band; and disconnecting the second element from the ground plane when the first element is not transmitting RF signals modulated at one or more frequencies within the at least one predetermined first frequency band.

* * * * *